April 28, 1964

G. ALFIERI 3,130,901

COMPRESSORS FOR COMPRESSED AIR SYSTEMS
PARTICULARLY USED ON VEHICLES

Filed June 5, 1961

INVENTOR.
GIUSEPPE ALFIERI
BY McGlew and Toren
ATTORNEYS

United States Patent Office 3,130,901
Patented Apr. 28, 1964

3,130,901
COMPRESSORS FOR COMPRESSED AIR SYSTEMS PARTICULARLY USED ON VEHICLES
Giuseppe Alfieri, Milan, Italy, assignor to Fabbrica Italiana Magneti Marelli S.p.A., Milan, Italy
Filed June 5, 1961, Ser. No. 114,942
Claims priority, application Italy June 24, 1960
4 Claims. (Cl. 230—187)

The main patent describes a single cylinder compressor, and on the body of which, in correspondence with the free end of the projecting shaft, there is provided a contact surface which over and above avoiding axial displacement of the shaft towards the inside, at the same time serves as the resting edge for the connecting rod mounted on said extremity: the axial displacement of the shaft towards the exterior being avoided by a shoulder located on the internal extremity of the shaft bushing.

The present first supplementary addition to the main patent refers to improvements in the same type as that mentioned above and relating to compressors or single crank alternating engines incorporating multi cylinders in V, W, Y or radial formation.

Said improvements are characterized by the fact that the same shoulder means used to avoid axial displacements towards the interior of the protruding extremity of the crankshaft and as abutment of the main connecting rod mounted on said extremity in cooperation with those means used to avoid the axial displacements of the shaft towards the exterior, are also used as a shoulder to the coupling pin or pins of the articulated rods coupled up to the master connecting rod.

Said means comprise a flat surface on which coincide the extremity of the crank shaft and the head of the coupling pin or pins of the articulated rods hinged coupled to the master connecting rod at such a distance so as to allow perfect lubrication of the assembly and the elimination of danger of seizing caused by deformations due to over heating: said shoulder surface can be constituted by a sheet of suitable material, and in any case fixed to the crankcase or directly made by a casting made on the compressor casing, or on the engine or on the engine cover, and having been given a burnishing and hardening treatment.

Purely as an example and not being limitive to the scope of the invention, the attached drawing shows a preferred arrangement of the invention.

Figure 1:
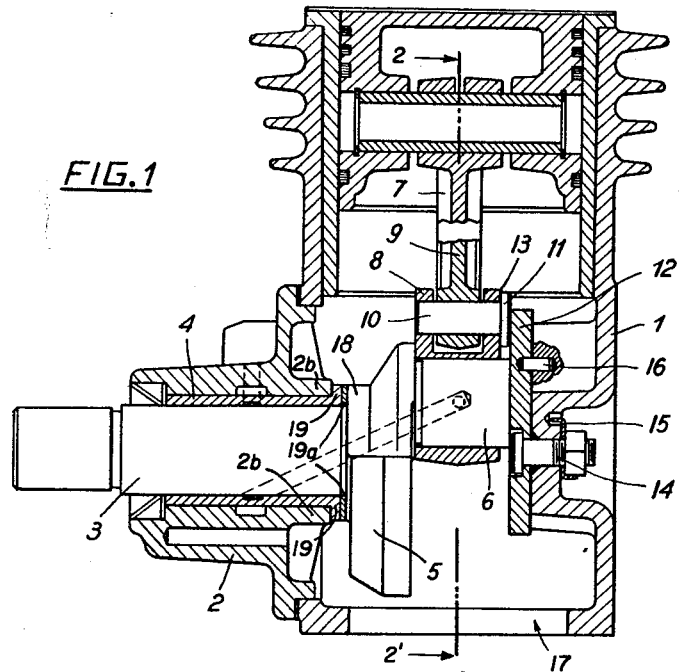
FIGURE 1 is an axial section of the central part of a coplanar V twin cylinder compressor with a single crank.

In the drawing 1 indicates the body of the compressor, and 2 indicates a lateral closure cover in which there is provided a cylindrical recess constituting a seat for shaft 3, which rests within the cylindrical recess within a bushing 4.

Shaft 3 extends into the body 1 with its eccentric arm 5 terminating with a pin of crank 6 on which is mounted the master connecting rod 7, furnished at the base with one single supporting fork 8 on which is fitted an articulated rod 9 by means of the coupling pin 10.

The coupling pin 10 has a cylindrical head 11, the bases of which are respectively retained between the shoulder plate 12, and wall 13 of the supporting fork 8.

Plate 12, in addition to serving to prevent coupling pin 10 from slipping out from its fork support (which would cause the master connecting rod 7 to slip from crank pin 6) also serves to prevent shaft 3 from moving axially towards the interior of the compressor body 1.

The plate 12 is fixed internally to body 1 by means of through bolt 14 with cotter pin 15, and with a plug 16 which prevents rotation of the plate 12 around the bolt 14.

Figure 2:
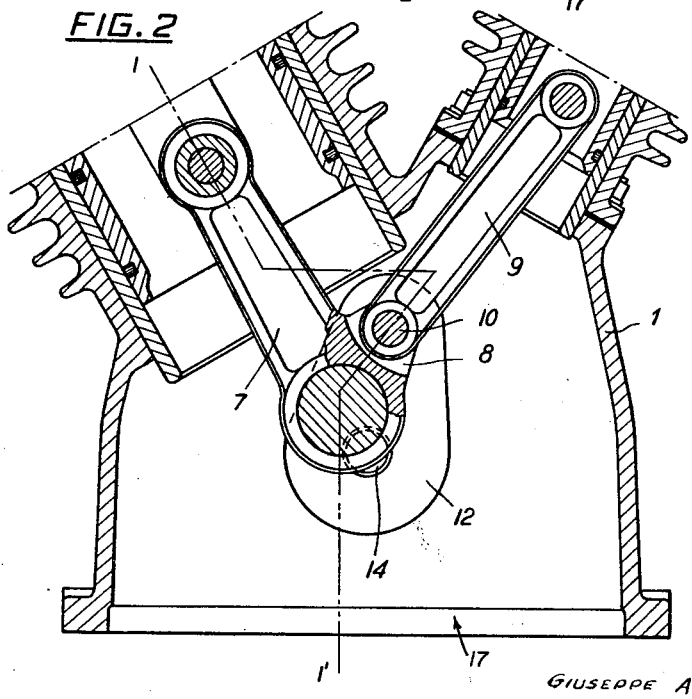
FIGURE 2 is a partial cross section view across dotted line II—II of FIGURE 1.

Provided in the compressor body 1 is an opening 17 which is situated proximate to the plate 12, as shown at FIGS. 1 and 2. A suitable gasketed cover plate, not illustrated, is provided for closing the opening 17; the gasketed cover plate being suitably bolted to the body 1, which has threaded bores, not illustrated, provided therein to receive the bolts. Thus, the opening 17 serves as an access port to the interior space of the compressor body 1 so that the component parts of the compressor may be easily assembled, adjusted and disassembled.

Also and in order to prevent the shaft 3 from executing axial movements towards the exterior of the compressor, the bushing 4 is provided on the end inside body 1 with a flange 19 which is situated between the ledge 18 of the arm 5 and the ledge 2b of the cover 2. For this purpose of further ensuring a highly precise assembly that will eliminate axial motion of the shaft 3 toward the left (according to the orientation shown at FIG. 1; i.e., in a direction outwardly from the compressor body 1) an annular shim ring 19a is interposed between the face of ledge 18 and the face of the flange 19. The shim ring 19a may be of suitable thickness to prevent axial "play" of the shaft 3.

The improvement described permits a simple and rapid assembly of several moving parts of the compressor due to the fact that the master connecting rod and the articulated rod to which it is coupled are freely mounted on the crank pin and the whole assembly is arranged by the simple fixing on of the compressor or motor cover 2. The cover 2 may be suitably gasketed and secured to the compressor body 1 by means of bolts, not illustrated; the body 1 having threaded bores, not illustrated, suitable for receiving the bolts. One way of assembling the arrangement shown at FIGS. 1 and 2 is to first assemble the sub-assembly of the cover 2, shaft 3 and pin the crank 6 to the eccentric arm 5. Then this assembled sub-assembly can be inserted into the body 1 so that the crank 6 enters the receiving hole provided in the supporting fork 8. Of course, before the above-described sub-assembly is assembled with compressor body 1 and its pistons and cylinders, the coupling pin is inserted in its receiving hole in the fork 8 and the plate 12 is fastened to the inside wall of the body 1.

I claim:

1. A multi-cylinder and piston air compressor comprising a body defining a plurality of cylinders, a piston head reciprocally mounted in each of said cylinders, said body having a side with a lateral shaft opening defined therein, a crankshaft having a crank pin eccentrically connected to an end thereof inwardly of said body, a master connecting rod connected to said crank pin at its one end and connected at its opposite end to one of said piston heads, said master connecting rod having an integrally connected supporting fork, an articulated rod, a pin coupling one end of said articulated rod to said fork, said articulated rod having its other end connected to another of said piston heads, said body having a wall portion extending inwardly towards said shaft at a side opposite from said shaft opening, and a bearing plate mounted on the interior of said wall portion and extending radially outwardly beyond the termination of said wall portion into abutting relationship with said crank pin and said articulated rod coupling pin for prohibiting axial displacement of said shaft and said coupling pin in a direction inwardly of said body, said plate being of a shape to be in abutting relationship with said crank pin and said articulated rod coupling pin during the movement thereof but leaving the remaining portion of said body unobstructed, said crankshaft and eccentrically connected crank pin being removable from said body through said lateral shaft opening, said body including an additional opening therein to permit access into said body, the plane of said bearing plate passing through said additional opening.

2. The invention as defined in claim 1, wherein said bearing plate comprises a flat surface sufficiently spaced from the inner ends of said crank pin and coupling pin so as to permit for proper lubrication while prohibiting seizing of said pins due to overheating.

3. The invention as defined in claim 1, wherein said bearing plate is detachably connected to the internal wall of said body.

4. The invention as defined in claim 1, wherein said shaft is provided with a shim to prohibit axial movement of the shaft.

References Cited in the file of this patent

UNITED STATES PATENTS

| | | |
|---|---|---|
| 1,107,687 | Merralls | Aug. 18, 1914 |
| 1,507,524 | Steurs | Sept. 2, 1924 |
| 1,982,670 | Johnson | Dec. 4, 1934 |
| 2,234,291 | Dodge | July 13, 1943 |
| 2,426,100 | Holden et al. | Aug. 19, 1947 |
| 2,452,232 | Fischer | Oct. 26, 1948 |

FOREIGN PATENTS

| | | |
|---|---|---|
| 506,623 | France | Aug. 26, 1920 |
| 587,228 | Great Britain | Apr. 17, 1947 |